May 23, 1933.    J. A. ARENZ    1,910,420
MACHINE FOR THREADING AUGER BIT LEAD SCREWS
Filed May 29, 1931    3 Sheets-Sheet 3

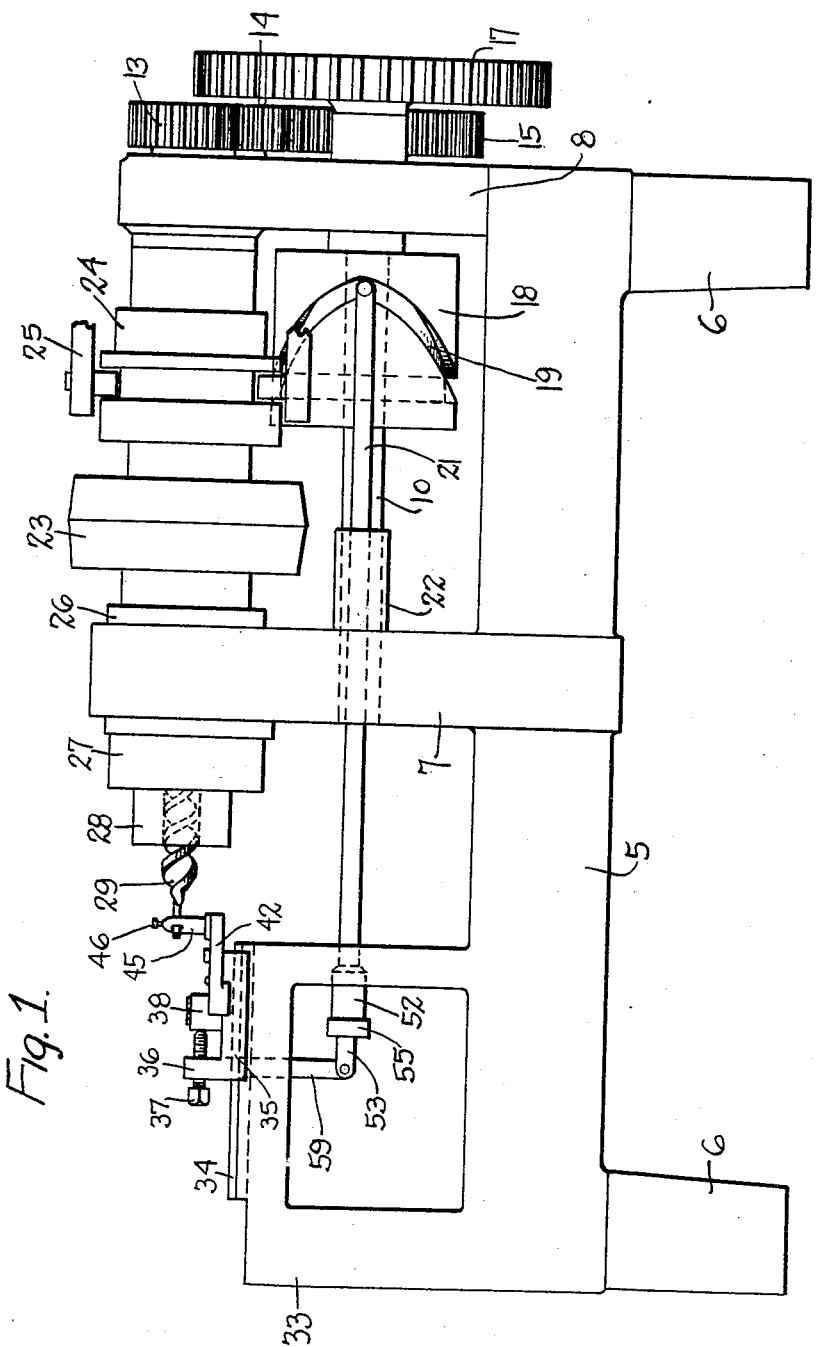

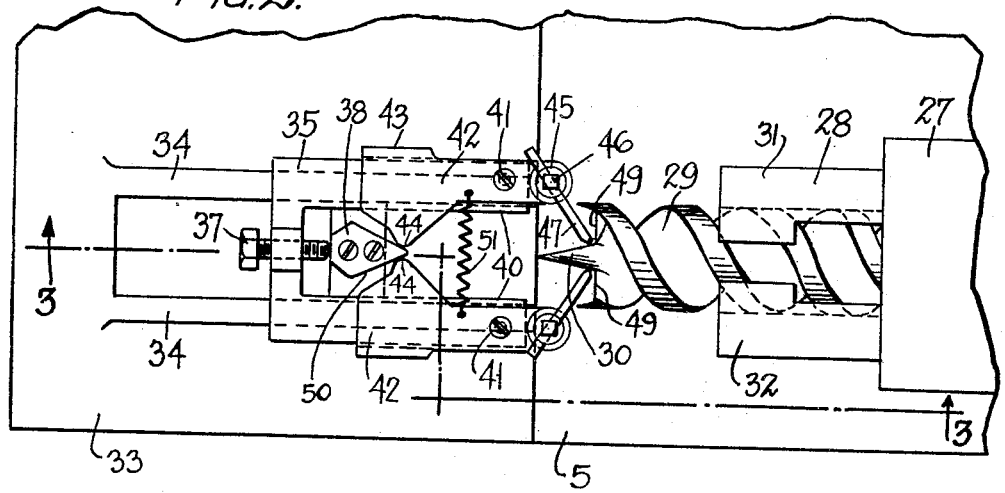
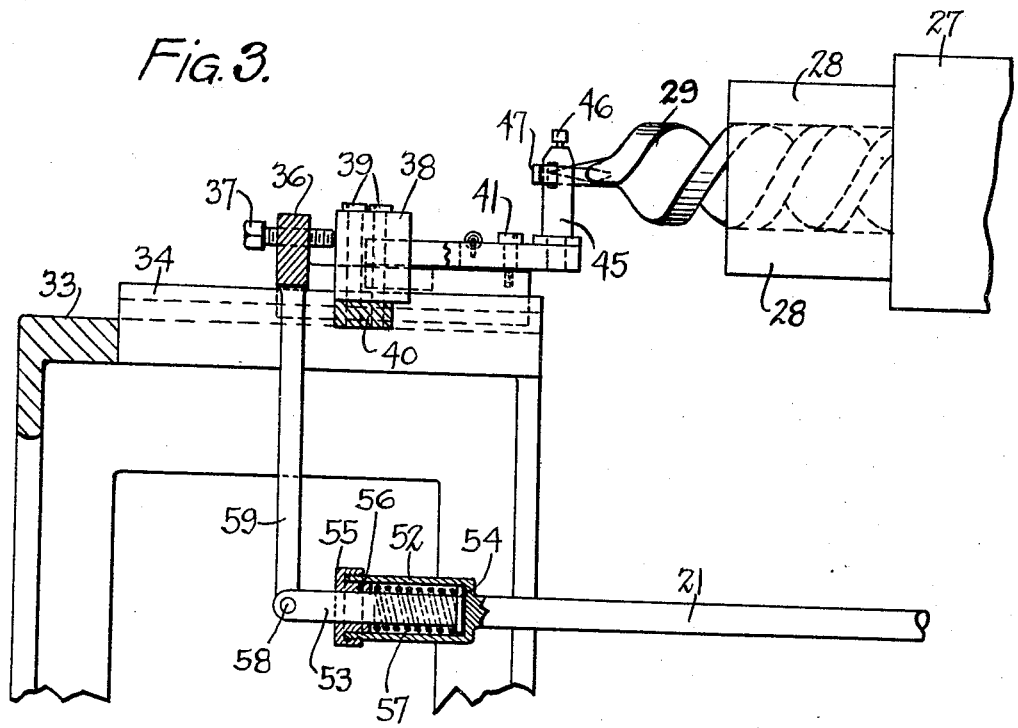

Inventor
JOHN A. ARENZ
By His Attorney
John J. Lynch

Patented May 23, 1933

1,910,420

UNITED STATES PATENT OFFICE

JOHN A. ARENZ, OF MOUNT VERNON, NEW YORK, ASSIGNOR TO DOUBLE THREAD BIT COMPANY, OF WILMINGTON, DELAWARE, A CORPORATION OF DELAWARE

MACHINE FOR THREADING AUGER BIT LEAD SCREWS

Application filed May 29, 1931. Serial No. 540,945.

This invention relates to thread cutting tools and machines and in particular to a machine arranged for threading the lead screw end of an auger bit.

A particular object of my invention is to automatically thread the lead screw of an auger bit and particularly to cut thereon a double threaded, single pointed screw which is equally well shaped for either hard or soft wood and so constructed that the auger will be fed into the wood at a uniform degree of travel and at a rate of speed much higher than that at which auger bits in present use are capable of entering material to be bored.

Another important object of my invention is to provide a machine, the tools of which are operated automatically to cut the lead screw of an auger so that the same is provided with a single pointed speed end which, combined with a plurality of upper and lower cutting edges on the auger body proper, provides a bit which uses a minimum driving power and cuts with greatest rapidity.

A still further object of my invention is to provide a machine in which the auger bits are fed through a mandrel successively and in which the tools are so operated that they can enter between the cutting points of the auger bit to begin the cutting of a thread on the lead screw at a point adjacent its junction with the body of the bit.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 is a view in side elevation of a machine constructed in accordance with my invention, the position of the lead screw cutting mechanism being illustrated in the position it would occupy when starting the cutting operation.

Figure 2 is an enlarged plan view of the cutting mechanism showing the use of the oppositely disposed tools for cutting a thread on the lead screw blank.

Figure 3 is a view in section taken on the line 3—3 of Figure 2 and shows the operating mechanism and thread cutting tool.

Figure 4:
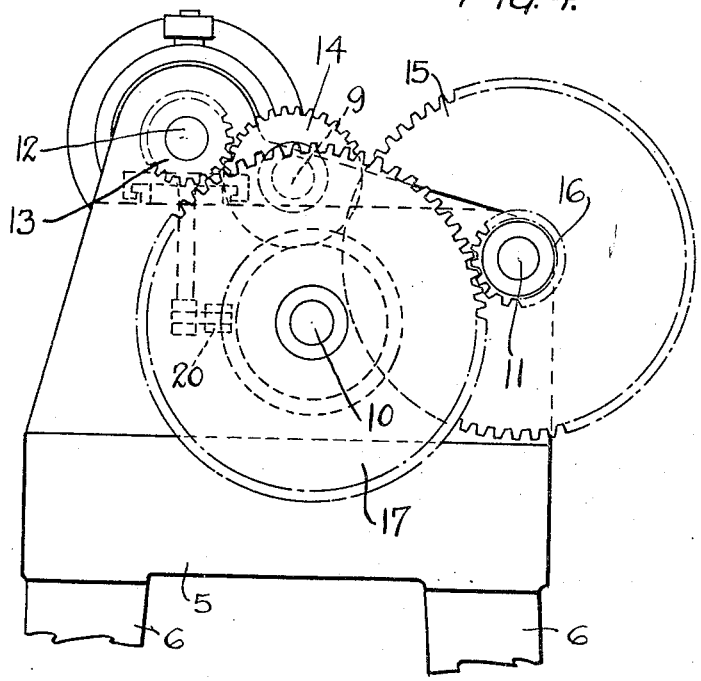
Figure 4 is a view in elevation taken at the right hand end of the machine as illustrated in Figure 1 showing the gear arrangement for operating the mechanism.
Figure 5:
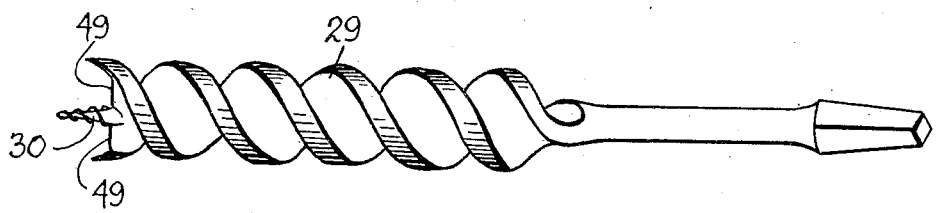
Figure 5 is a view of an auger bit, the lead screw end of which has been finished by the machine, in this instance, for the purpose of illustration, the auger bit has been shown with a double threaded, single pointed speed screw.
Figure 6:
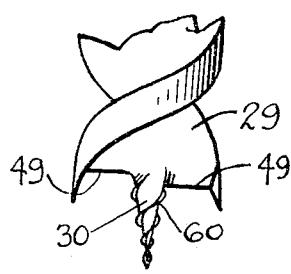
Figure 6 is an enlarged view of the lead screw end of the auger bit showing the double thread lead screw formed thereon.

Referring to the drawings in detail, 5 indicates the machine frame supported on the legs 6 which preferably form an integral part thereof and provided with the frame brackets 7 and 8 in which are journalled the shafts 9, 10 and 11. There is also journalled in these frames, the drive shaft 12 upon which is mounted, the driving pinion 13 which meshes with the intermediate gear 14 mounted on the shaft 9, the gears being all disposed outside the frame brackets 8.

The intermediate gear 14 meshes with and drives the gear 15 mounted on the shaft 11 and the shaft carries a pinion 16 which meshes with and drives the gear 17. This gear 17 is mounted on the cam shaft 10 and is arranged to revolve at a uniform speed and in proper relation to the revolving movement of the mandrel which is in alignment with the shaft 12, the cam 18 mounted on said shaft. This cam is of the drum type and is provided with a cam slot 19 in which rides a roller 20. This roller is carried on the end of a reciprocating cam arm 21 which passes through a suitable bearing 22 formed integral with the frame bracket 7.

The drive shaft 12 carried the usual belt pulley 23 and the rotation of the shaft 12 is controlled by the operation of a clutch 24, the ends of the operating levers of which are indicated as at 25, it being understood that the clutch operates in the usual manner to transfer the drive from the pulley 23 to the drive shaft 12.

The drive shaft 12 is journalled in suitable bushings 26 in which is mounted, the mandrel housing 27 for the purpose of carrying the adjustable mandrel 28 to which is fed and in which is held the auger bit 29.

As illustrated in Figure 2, this auger bit 29 is provided with a lead screw blank 30 upon which it is desired to turn a lead screw. The bit 29 is securely held in the jaws 31 and 32 of the chuck 28.

In order to turn the lead screw on the blank of the auger bit, I provide at one end of the machine, the table portion 33 on the upper surface of which is machined, the guide 34, along which is arranged to be reciprocated, the slide 35. The slide is substantially U-shaped and at its closed end is provided with an upstanding boss 36 in which is threaded an adjusting screw 37. This adjusting screw is for the purpose of limiting the movement of the slide 35 in its operation toward the bit holding chuck and it is arranged to come into contact with the back of a removable master cam 38 which, through the medium of screws 39 is secured to the bridge 40 which joins the guide 34 and is preferably cast integral with the table top 33.

The forward extensions 40 of the slide 35 have pivoted thereto through the medium of the pivot bolts 41, the tool arm 42.

Inasmuch as both arms are substantially alike in construction and perform the same function, it is not necessary to describe both. The tool arm is arranged at one side with a depending apron 43 which is arranged to engage the side of the slide 35 to limit the inward movement of the arm 42 so that the nose 44 thereof will have slightly spaced relation with a similar nose on the opposite arm 42. The outer end of the arm 42 carries an adjustable tool post 45 in the upper end of which is secured, through the medium of a set screw 46, the cutting tool 47. This cutting tool is directed inwardly at an angle so that its cutting end engages the lead screw blank at a point adjacent the cutting edges 49 of the bit 29. During a retractile movement of the slide 35, that is, when it is moving away from the bit, the nose 44 of each of the arms 42, rides up on the surfaces 50 of the master cam with the result that the tools 47 are brought closer together and the rate of travel of the slide 35 being in proportion to the pitch of thread desired on the end of the auger bit lead blank, will cut a double thread on the blank terminating at a single piercing point in the end thereof. The depth of thread and other dimensions may be governed by placing the master cam to one of such dimensions that the arms 42 are given the proper movement so that the tools will perform the cutting operation.

A spring 51 is employed between the arms 42 which normally maintain the arms 42 in their non-cutting position. As soon, however, as the slide 35 starts to move away from the bit, the arms 42 will be thrown outwardly against the action of the spring 51 by reason of the extensions 44 thereof riding up on the cam surfaces 50 and the tools will start the cutting operation.

Various adjustments are provided through the medium of the screws 37, that is, if the cutting operation is to be started early or late, the screw is adjusted to vary the movement of the slide 35, in which case, the tools themselves will be adjusted to the suitable angle.

The movement of the slide 35 is accomplished through the medium of the cam arm 21 or rod, one end of which, as before noted, is provided with a cam roller which operates in the cam slot 19 and the other end of which, as illustrated in Figure 3, is provided with a cup 52, in which is housed, the end of a link 53 provided with a collar 54 which normally seats in the bottom of the cup 52.

The end of the cup 52 is closed by the cap 55 whose inner extension 56 abuts one end of a compression spring 57, the other end of the spring abutting the flange 54 which forms at the end of the link 53. The link 53 is connected as at 58 to the depending arm 59, this arm being cast integral with the closed end of the slide 35, as indicated.

The cam is so designed that the slot 19 thereof provides, during a half revolution, a tool positioning and cutting operation and during the other half revolution of the cam, the tool remains in its inoperative position to permit the placing of the bit 29 within the chuck 28, or in the event that automatic feeding mechanism is employed, to give time for the mechanism to carry out its function, it being understood that the auger bit will be placed in substantially the same position each time so that a minimum of adjustment would be required.

The tension connection between the cam rod 21 and the slide 35 is for the purpose of permitting the cam to complete its revolving movement even after the movement of the slide 35 has been arrested by reason of the screw 37 coming into contact with the back of the master cam 38, a further movement of the rod 21 will compress the spring 57 so that no damage to the operating parts of the mechanism will take place.

The auger bit 29 which, in itself, is of a special type of construction embodying a number of cutting edges 49 at its lower end is provided with the shank 30, as before mentioned upon which is cut, a lead screw 60. This lead screw facilitates the entrance of the auger into the wood and substantially drawing it in so that labor required in using the auger bit is reduced to a minimum and the auger is fed into the wood at a uniform degree of travel and at a rate of speed much higher than that at which present auger bits in use are capable of entering material to be bored.

It is evident, therefore, that I have provided a machine in which the lead screw end of an auger bit may be operated upon quickly and efficiently to form thereon a thread of any dimension, pitch or shape and also a machine in which the cutting operation is performed with a minimum of time and with a simplicity of mechanism which permits the change of existing screw machines so that the threading operation on the end of the bit may be performed thereby.

While I have illustrated and described my invention with some degree of particularity, I realize that in practice various alterations therein may be made without departing from the spirit of the invention or the scope of the appended claim.

What I claim is:—

An auger bit lead screw threading machine comprising a bit holding chuck, a slide means for reciprocating the slide toward and away from the chuck, a cam, a plurality of tool carrying arms pivotally mounted on said slide, cam engaging extensions on said arms for moving said arms toward each other during a threading movement, a spring connecting said arms tending to oppose the camming movement of said arms, a slide cam, means for revolving the chuck and slide cam, and a yieldable connection between the slide cam and said slide for reciprocating the slide.

In testimony whereof I affix my signature.

JOHN A. ARENZ.